US009395936B2

(12) United States Patent
 Sakata

(10) Patent No.: US 9,395,936 B2
(45) Date of Patent: Jul. 19, 2016

(54) METHOD AND APPARATUS FOR REMOTE STORAGE PERFORMANCE DATA COPY

(71) Applicant: HITACHI, LTD., Tokyo (JP)

(72) Inventor: Masayuki Sakata, Kirkland, WA (US)

(73) Assignee: HITACHI, LTD., Tokyo (JP)

(*) Notice: Subject to any disclaimer, the term of this patent is extended or adjusted under 35 U.S.C. 154(b) by 541 days.

(21) Appl. No.: 13/867,449

(22) Filed: Apr. 22, 2013

(65) Prior Publication Data

US 2014/0317366 A1   Oct. 23, 2014

(51) Int. Cl.
 G06F 12/00   (2006.01)
 G06F 3/06   (2006.01)
 G06F 11/20   (2006.01)

(52) U.S. Cl.
 CPC ............ G06F 3/067 (2013.01); G06F 3/065 (2013.01); G06F 3/0619 (2013.01); G06F 11/2076 (2013.01); G06F 2201/855 (2013.01)

(58) Field of Classification Search
 CPC ........ G06F 11/2056–11/2094; G06F 11/3485; G06F 2201/855
 USPC ...................................................... 711/162
 See application file for complete search history.

(56) References Cited

U.S. PATENT DOCUMENTS

| 7,065,589 | B2 | 6/2006 | Yamagami | |
|---|---|---|---|---|
| 7,266,656 | B2* | 9/2007 | Chen et al. | 711/162 |
| 2005/0033827 | A1* | 2/2005 | Yamagami | 709/219 |
| 2012/0221521 | A1* | 8/2012 | Chiu et al. | 707/622 |

FOREIGN PATENT DOCUMENTS

EP    2 056 200 A1   5/2009

* cited by examiner

*Primary Examiner* — Charles Rones
*Assistant Examiner* — Nanci Wong
(74) *Attorney, Agent, or Firm* — Mattingly & Malur, PC

(57) ABSTRACT

A storage system comprises: a storage device; and a controller operable to manage a primary volume in the storage system of a remote copy pair with a secondary volume of another storage system by using a storage area of the storage device, and send a first type copy data to said another storage system according to a remote copy procedure of the remote copy pair, so that said another storage system can update the secondary volume based on the first type copy data. The controller is operable to create a second type copy data by using performance data of the primary volume, and to send the second type copy data to said another storage system according to the remote copy procedure, so that said another storage system can use the performance data of the primary volume for performance data of the secondary volume based on the second type copy data.

20 Claims, 12 Drawing Sheets

System Configuration of this invention

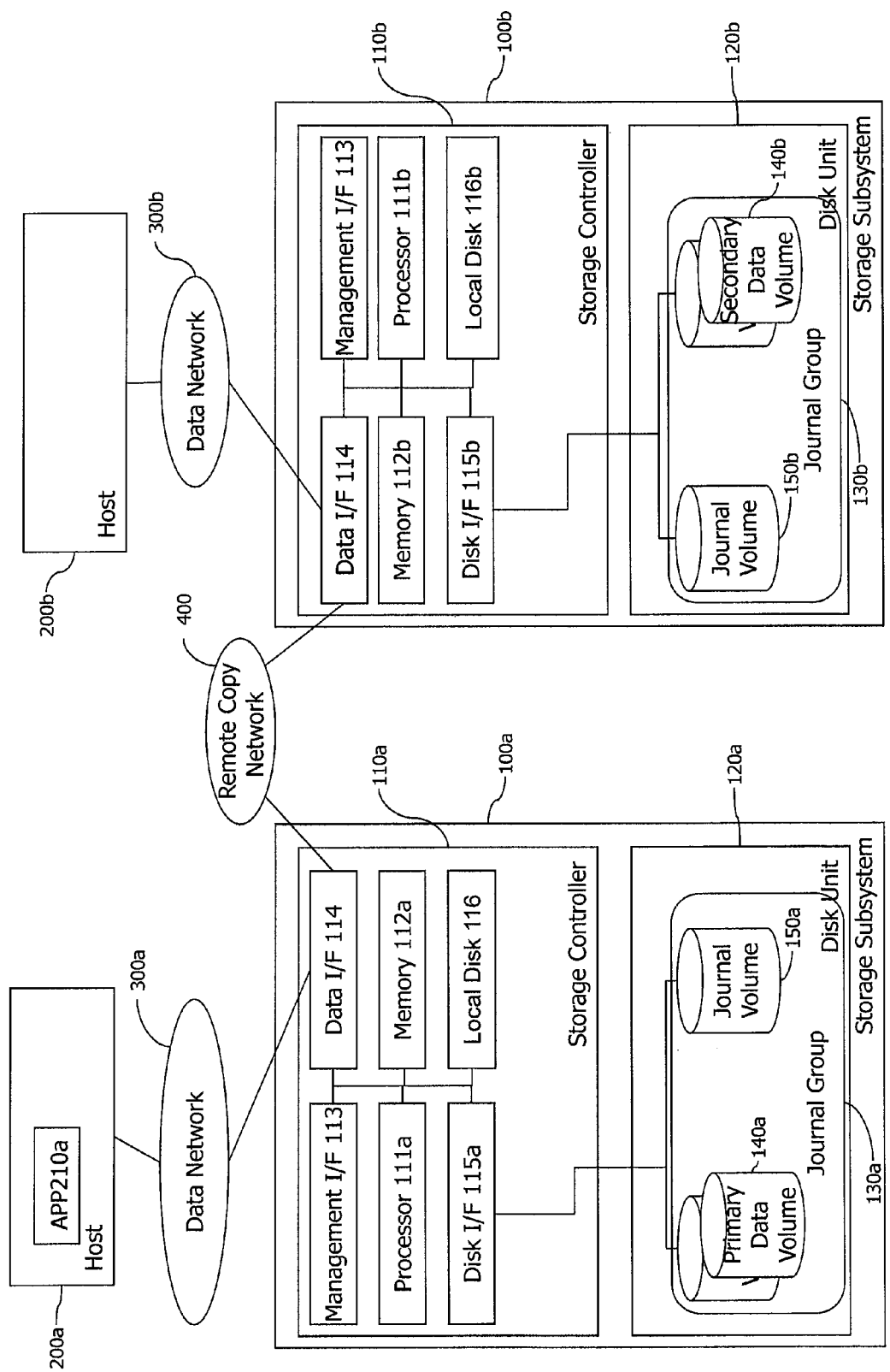
Fig.1 System Configuration of this invention

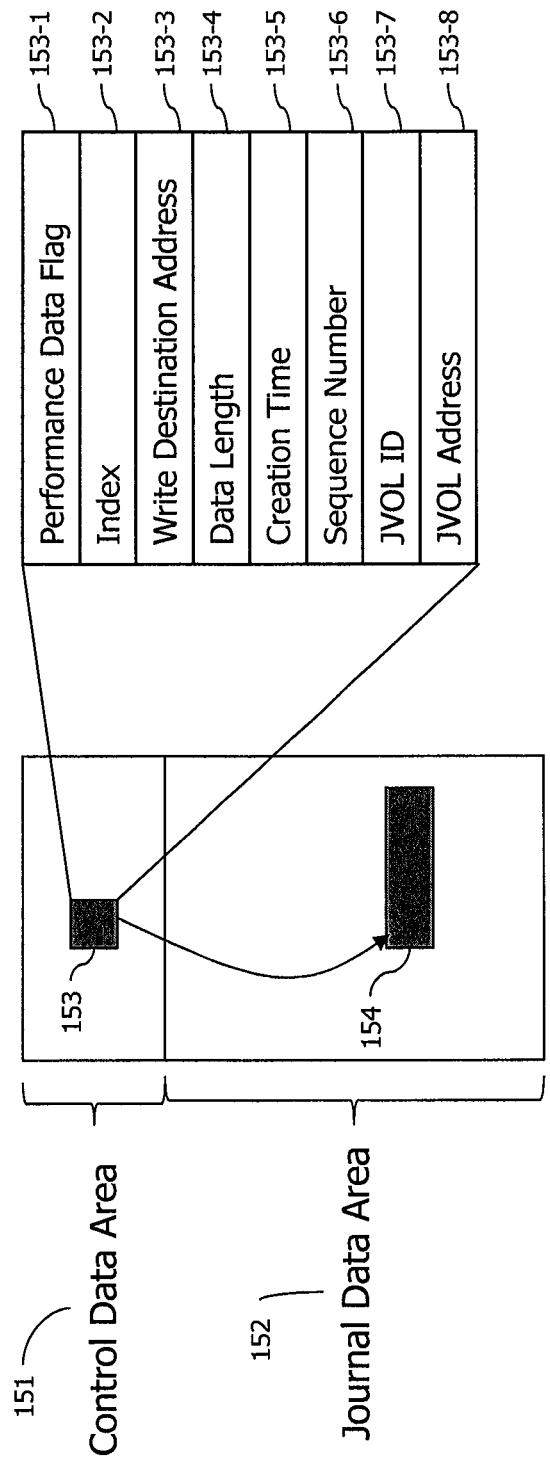
Fig.2 Software Module Configuration on Storage Controller

Fig.3 Software Module Configuration of Storage Controller

| JNL Group Mapping ID | Primary Storage System | Primary JNL Group ID | Secondary Storage System | Secondary JNL Group ID | Sequence Counter |
|---|---|---|---|---|---|
| JGM_1 | SS1 | JNLG_01 | SS2 | JNLG_01 | 123 |
| JGM_2 | SS2 | JNLG_02 | SS1 | JNLG_02 | 4013 |
| ... | ... | ... | ... | | |

JNL Group Mapping Table 112-06

Fig.4 Example of JNL Group mapping table

| Pair ID | JNL Group Mapping ID | PVOL ID | SVOL ID | Status | Size | BJPtr | Perf. Data Ctrl | Last Timestamp |
|---|---|---|---|---|---|---|---|---|
| P_1 | JGM_1 | VOL_01 | VOL_01 | PAIR | 100G | 0x1111 | COPY | 2013/02/02 10:00:00 |
| P_2 | JGM_1 | VOL_02 | VOL_03 | PSUS | 200G | 0x2222 | NONE | 2013/02/02 10:00:00 |
| P_3 | JGM_2 | VOL_04 | VOL_04 | COPY | 300G | 0x3333 | NONE | 2013/02/02 10:00:00 |
| P_4 | JGM_2 | VOL_05 | VOL_06 | PAIR | 200G | 0x4444 | ESTIMATE | 2013/02/02 10:00:00 |
| ... | | | | | | | | |

Volume Pair Table

Fig.5 Example of Volume pair table

| JNL Group ID | JNL Volume ID | Size |
|---|---|---|
| JNLG_01 | J-VOL_01 | 10G |
| JNLG_01 | J-VOL_02 | 10G |
| JNLG_02 | J-VOL_03 | 20G |
| JNLG_02 | J-VOL_04 | 10G |
| ... | ... | ... |

Fig.6 Example of Journal Volume Table

| Volume ID | Timestamp | Read I/O [I/O per sec] | Read Xfer [Byte per sec] | Write I/O [I/O per sec] | Write Xfer [Byte per sec] | Read Hit [%] | Write Hit [%] |
|---|---|---|---|---|---|---|---|
| VOL_01 | 2012/01/01 00:00:00 | 1000 | 100 | 10 | 10 | 90 | 5 |
| VOL_02 | 2012/01/01 00:00:00 | 100 | 10 | 20 | 10 | 30 | 30 |
| VOL_01 | 2012/01/01 00:01:00 | 200 | 1000 | 40 | 1000 | 50 | 15 |
| VOL_02 | 2012/01/01 00:01:00 | 200 | 200 | 60 | 200 | 70 | 15 |

Performance Data Table

Fig.7 Example of Performance Data Table

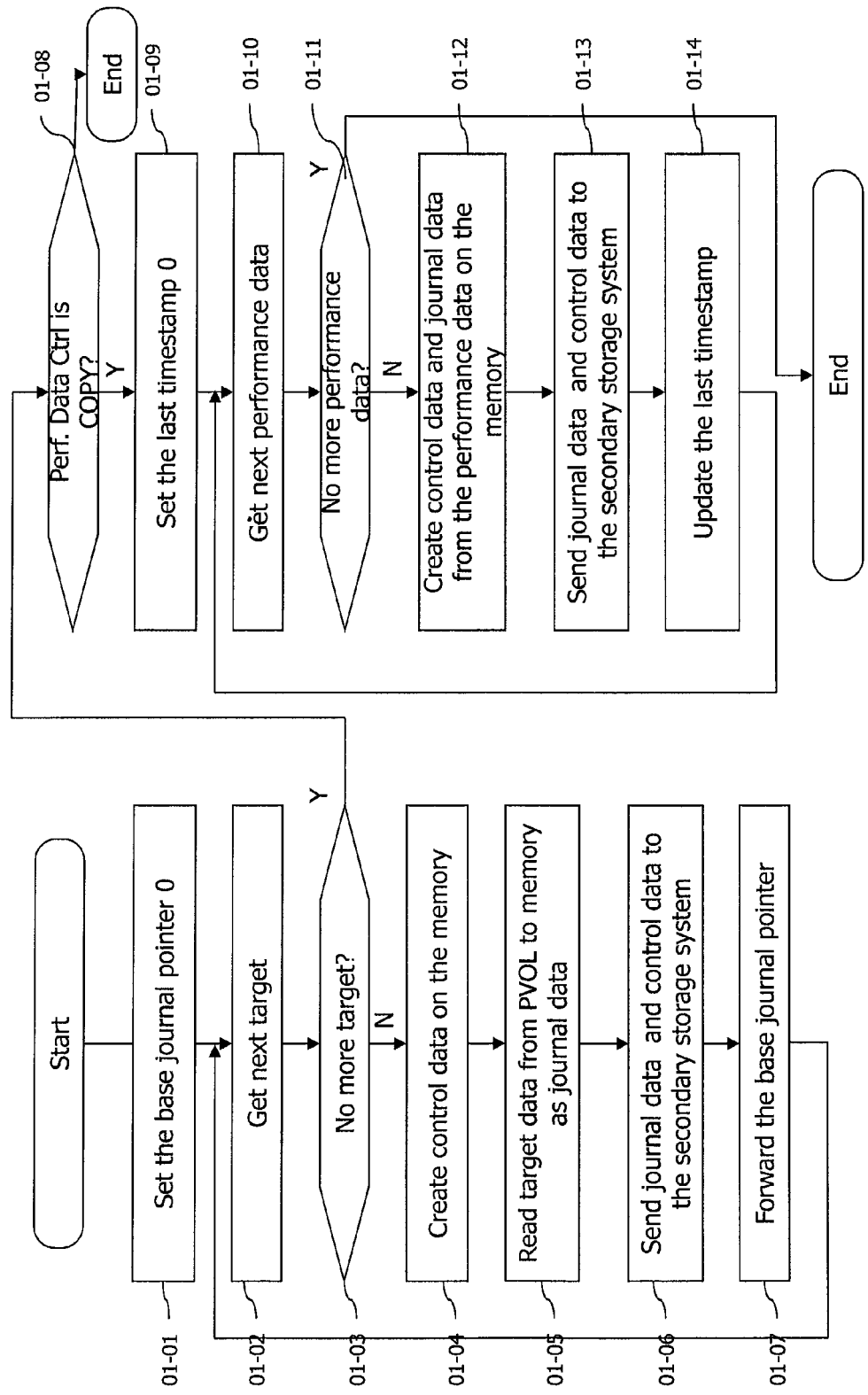
Fig.8 Flowchart of initial copy process of remote copy control

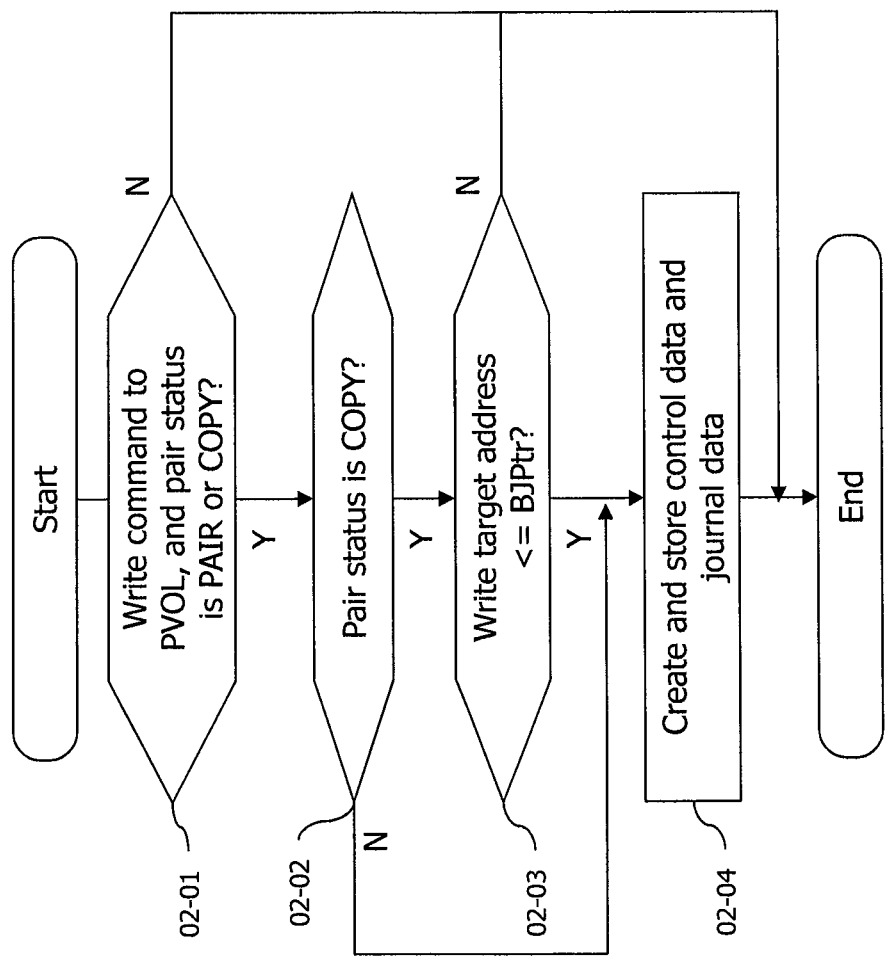
Fig.9 Flowchart of generating journal

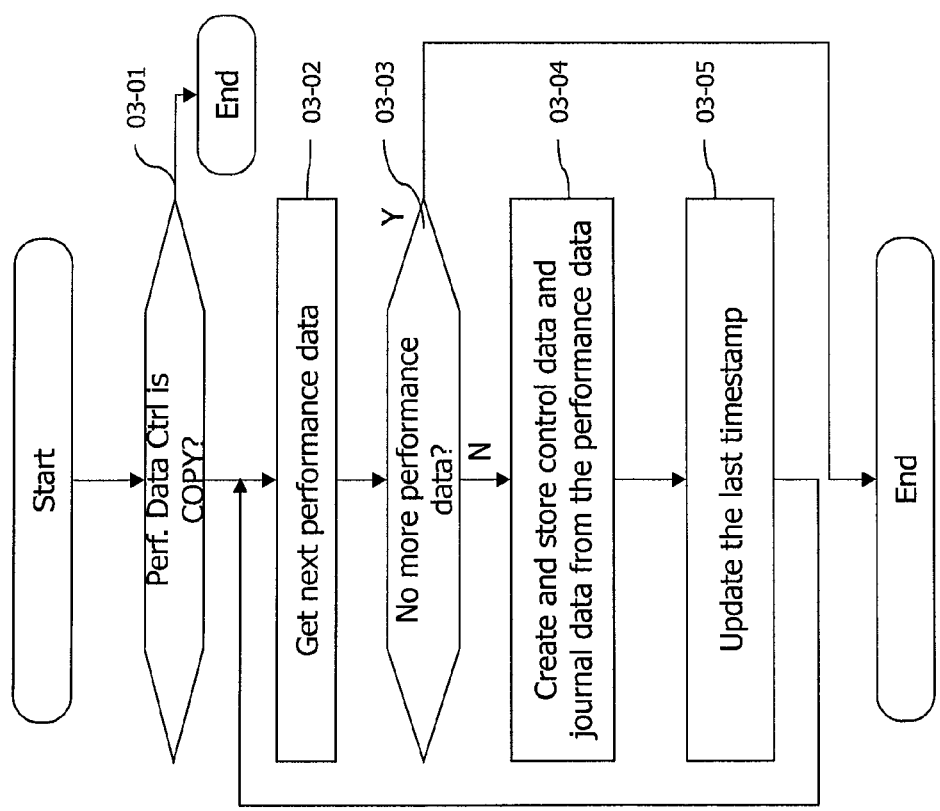
Fig.10 Flowchart of generating performance data journal

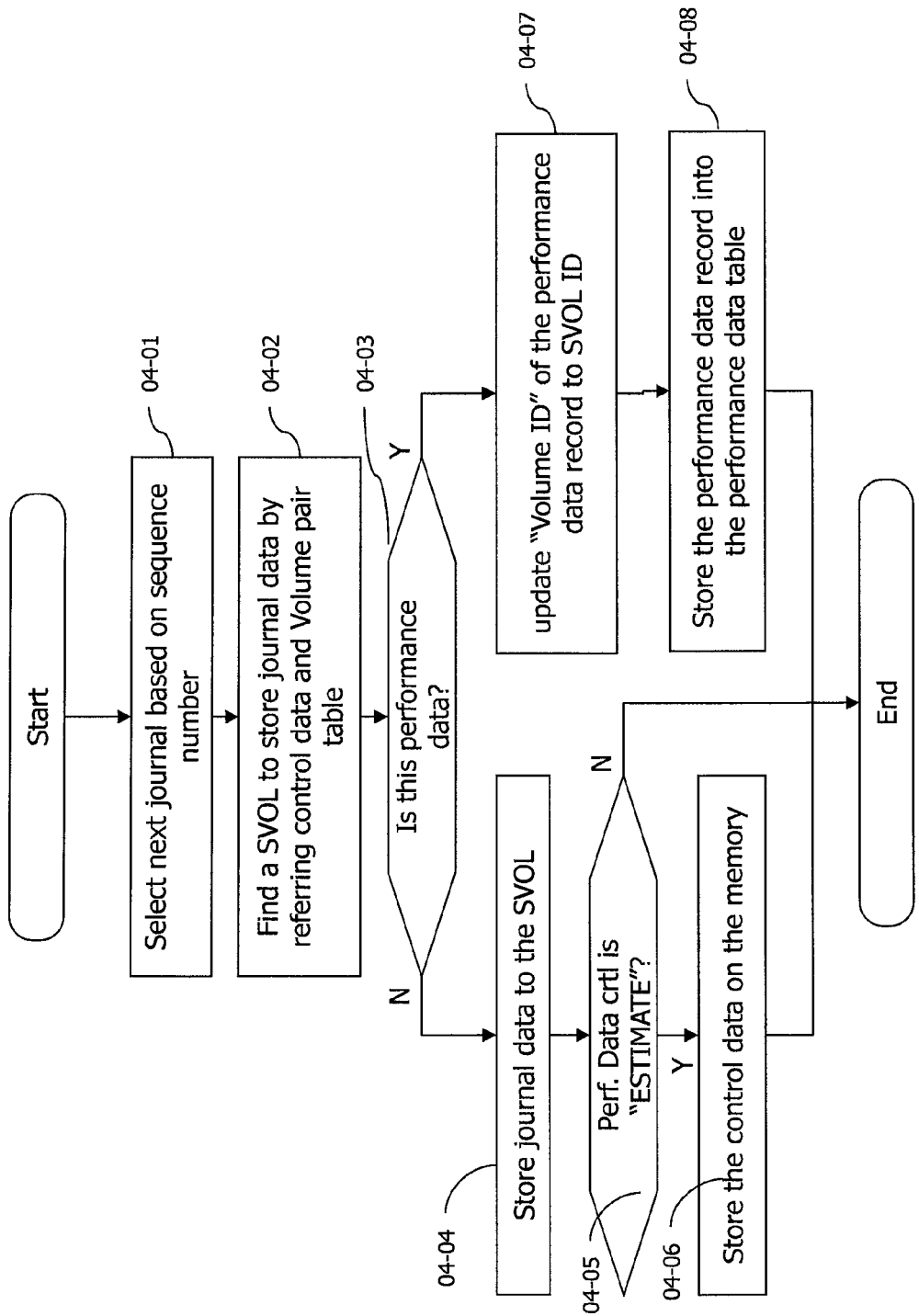
Fig.11 Flowchart of restoring journal data and performance journal data

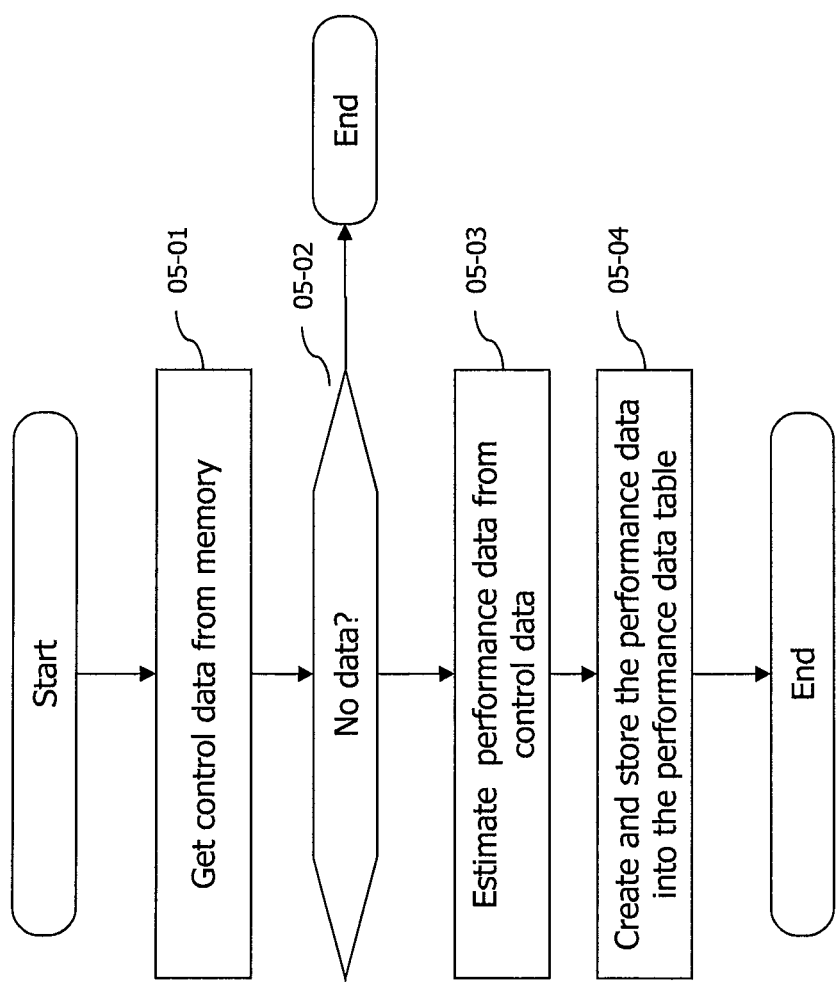
Fig.12 Flowchart of performance estimation

METHOD AND APPARATUS FOR REMOTE STORAGE PERFORMANCE DATA COPY

BACKGROUND OF THE INVENTION

The present invention relates generally to storage systems and, more particularly, to remote copy between a primary storage system and a secondary storage system involving the use of performance data of the primary storage system in the secondary storage system.

Data storage system users are acutely interested in maintaining backup data in order to prevent loss of valuable data from failure in a storage unit which may result from occurrence of natural disasters, e.g., earthquake or storm. Currently, two operational modes are used by storage systems to copy the data to the backup or secondary sites: synchronous mode and asynchronous mode.

In synchronous mode, a write request from a host to the primary storage system completes only after write data have been copied to the secondary storage system and acknowledge thereof has been made. Accordingly, this mode guarantees no loss of data at the secondary storage system since the write data from the host is stored in the cache of the primary storage system until the acknowledgement has been received from the secondary storage system. However, the primary and secondary storage systems cannot be placed too far apart, e.g., over 100 miles, under this mode. Otherwise, the storage systems cannot efficiently execute write requests from the host.

In asynchronous mode, a write request from a host to the primary storage system completes upon storing write data only to the primary system. The write data is then copied to the secondary storage system. That is, the data write to the primary storage system is an independent process from the data copy to the secondary storage system. Accordingly, the primary and secondary storage systems may be placed far apart from each other, e.g., 100 miles or greater.

A storage system is typically optimized to achieve higher storage data access performance using recent access log data and performance data. For example, a dynamic tier manager changes a storage volume allocation in several different physical disks (e.g., SSD, SAS, and SATA) which have different performance characteristics. In the event of a disaster or system migration, the system at the primary site can be recovered using the backup data at the secondary site. However, it is difficult to achieve the same level of storage access performance at the secondary site because there are no performance log data at the secondary site. One example involves primary site and secondary site that are owned by different entities or enterprises such as, for example, a case involving a hybrid cloud environment. The user may find it difficult to keep the same level of performance after the user recovers the entire system using backup data, because the performance log data is not taken over from the primary storage system.

EP2056200A1 disclose method and system for the time-series performance history, in which a volume included in a storage device is managed as one time-series performance history at the time of data rearrangement or device change. However, it does not show how to take over the performance history data during remote copy. Moreover, a centralized monitoring system manages multiple storage systems. In the event of a disaster, all monitoring data will be lost.

BRIEF SUMMARY OF THE INVENTION

Exemplary embodiments of the invention provide a way to allow the secondary storage system to use the performance data of the primary storage system in the secondary storage system in a remote copy situation between the two storage systems. The primary and secondary storage systems are configured to copy a selected volume in the asynchronous mode using journal data. The primary volume (PVOL) in the primary storage system and the secondary volume (SVOL) in the secondary storage system are identically maintained. The primary storage system stores the performance data of PVOL to journal volume as journal data. The secondary storage system receives the journal data, obtains the performance data from the journal data, and stores the performance data as a SVOL performance data. In the event where the primary storage system does not have the capability to send its performance data as journal data, the secondary storage system estimates the performance of PVOL from the journal data and uses the estimated performance in the secondary storage system.

By using this invention, it is possible to use the performance data from the primary storage system in the secondary storage system. It allows the storage system to optimize the performance of the target system (secondary storage system) before failover or migration of the source system (primary storage system). This invention is used for remote copy systems. One example involves primary site and secondary site that are owned by different entities or enterprises (e.g., a hybrid cloud environment).

In accordance with an aspect of the present invention, a storage system comprises: a storage device; and a controller including a processor and a memory, and being operable to manage a primary volume in the storage system of a remote copy pair with a secondary volume of another storage system by using a storage area of the storage device, and to send a first type copy data from the storage system to said another storage system according to a remote copy procedure of the remote copy pair, so that said another storage system can update the secondary volume based on the first type copy data. The controller is operable to create a second type copy data by using a performance data of the primary volume, and to send the second type copy data from the storage system to said another storage system according to the remote copy procedure of the remote copy pair, so that said another storage system can use the performance data of the primary volume for a performance data of the secondary volume based on the second type copy data.

In some embodiments, the storage system includes a plurality of primary volumes and the controller is operable to manage the primary volumes of remote copy pairs with secondary volumes of said another storage system by using storage areas of the storage device. The performance data of the primary volumes are stored in the memory with timestamps corresponding to the primary volumes. Each primary volume has a performance data control parameter which is associated with a corresponding secondary volume of a remote copy pair and indicates whether the performance data of said each primary volume is to be copied from the storage system to said another storage system. Upon receiving a request from said another storage system to read the second type copy data, the controller is operable to identify one or more primary volumes for which the performance data control parameter indicates the performance data of the one or more primary volumes are to be copied from the storage system to said another storage system, to set zero to a "Last Timestamp" of each remote copy pair associated with the one or more primary volumes, and for each particular primary volume of the one or more primary volumes, to perform an initial copy process which includes: sorting records of the performance data of the one or more primary volumes in ascending order by the corresponding timestamps, and selecting one or more records of the sorted records of the performance data of the particular primary volume that have a later timestamp than the "Last Timestamp" of the remote copy pair associated with the particular primary volume; creating and storing in the storage system a journal data and a control data for the selected one or more records of the performance data, the control data including a performance data flag that is set to indicate that the journal data is the performance data, and a sequence number that is incremented; sending the created journal data and control data as the second type copy data to said another storage system; updating the "Last Timestamp" of the remote copy pair associated with the particular primary volume to a latest timestamp value of the selected one or more records of performance data of the particular primary volume; and repeating the sorting and selecting, the creating and storing, the sending, and the updating until the one or more primary volumes are all processed.

In specific embodiments, after the initial copy process, the controller is operable to periodically perform a process of generating the second type copy data for each particular primary volume of the one or more primary volumes for which the performance data control parameter indicates the performance data of the one or more primary volumes are to be copied from the storage system to said another storage system, the process of generating the second type copy data including: sorting records of the performance data of the one or more primary volumes in ascending order by the corresponding timestamps, and selecting one or more records of the sorted records of the performance data of the particular primary volume that have a later timestamp than the "Last Timestamp" of the remote copy pair associated with the particular primary volume; creating and storing in the storage system a journal data and a control data for the selected one or more records of the performance data, the control data including a performance data flag that is set to indicate that the journal data is the performance data, and a sequence number that is incremented; and updating the "Last Timestamp" of the remote copy pair associated with the particular primary volume to a latest timestamp value of the selected one or more records of performance data of the particular primary volume.

In some embodiments, upon receiving a write command from a host computer to write data to a write target region of the primary volume, the controller is operable to: determine whether a pair status of a remote copy pair associated with the primary volume is COPY or PAIR; when the pair status is COPY, determine whether a base journal for preexisting data that has been residing on the primary volume prior to pairing with the secondary volume has already been taken; and when (i) the pair status is PAIR or (ii) the pair status is COPY and the base journal has not been taken, create and store in the storage system a journal data and a control data for the write command, the control data including a performance data flag that is set to indicate that the journal data is primary volume data of the primary volume, and a sequence number that is incremented, and send the created journal data and control data as the first type copy data to said another storage system.

In specific embodiments, the first type copy data comprises a first type journal data and the second type copy data comprises a second type journal data. The first type copy data comprises a first type control data having a performance data flag that is set to indicate that the first type journal data is primary volume data of the primary volume. The second type copy data comprises a second type control data having a performance data flag that is set to indicate that the second type journal data is the performance data of the primary volume.

In accordance with another aspect of the invention, a system comprises: a first storage system including a first storage device and a first controller having a first processor and a first memory; and a second storage system including a second storage device and a second controller having a second processor and a second memory. The first controller is operable to manage a primary volume in the first storage system of a remote copy pair with a secondary volume of the second storage system by using a storage area of the first storage device, and to send a first type copy data from the first storage system to the second storage system according to a remote copy procedure of the remote copy pair, so that the second storage system can update the secondary volume based on the first type copy data. The first controller is operable to create a second type copy data by using a performance data of the primary volume, and to send the second type copy data from the first storage system to the second storage system according to the remote copy procedure of the remote copy pair, so that the second storage system can use the performance data of the primary volume for a performance data of the secondary volume based on the second type copy data.

In some embodiments, the first storage system includes a plurality of primary volumes and the first controller is operable to manage the primary volumes of remote copy pairs with secondary volumes of the second storage system by using storage areas of the first storage device. The performance data of the primary volumes are stored in the first memory with timestamps corresponding to the primary volumes. Each primary volume has a performance data control parameter which is associated with a corresponding secondary volume of a remote copy pair and indicates whether the performance data of said each primary volume is to be copied from the first storage system to the second storage system. Upon receiving a request from the second storage system to read the second type copy data, the first controller is operable to identify one or more primary volumes for which the performance data control parameter indicates the performance data of the one or more primary volumes are to be copied from the first storage system to the second storage system, to set zero to a "Last Timestamp" of each remote copy pair associated with the one or more primary volumes, and for each particular primary volume of the one or more primary volumes, to perform an initial copy process which includes: sorting records of the performance data of the one or more primary volumes in ascending order by the corresponding timestamps, and selecting one or more records of the sorted records of the performance data of the particular primary volume that have a later timestamp than the "Last Timestamp" of the remote copy pair associated with the particular primary volume; creating and storing in the first storage system a journal data and a control data for the selected one or more records of the performance data, the control data including a performance data flag that is set to indicate that the journal data is the performance data, and a sequence number that is incremented; sending the created journal data and control data as the second type copy data to the second storage system; updating the "Last Timestamp" of the remote copy pair associated with the particular primary volume to a latest timestamp value of the selected one or more records of performance data of the particular primary volume; and repeating the sorting and selecting, the creating and storing, the sending, and the updating until the one or more primary volumes are all processed.

In specific embodiments, the second controller of the second storage system is operable to store received sets of control data and journal data in the second memory, and wherein the second controller of the second storage system is operable to periodically perform a process of restoring journal data to the secondary volume, the process of restoring journal data including: selecting a next set of control data and journal data to restore using the sequence number by keeping track of the sequence number of each set of control data and journal data which has been restored and comparing the sequence number of a most recently restored journal data with the sequence numbers of the sets of control data and journal data stored in the second memory; finding a secondary volume in the second storage system which corresponds to the primary volume associated with the selected set of control data and journal data; determining whether the selected journal data is performance data by checking the performance data flag of the selected control data; when the selected journal data is not performance data, storing the selected journal data in the corresponding secondary volume based on the selected control data, determining whether the performance data control parameter associated with the secondary volume is ESTIMATE or not and, if ESTIMATE, storing the selected control data on the second memory to be used to estimate performance of the primary volume associated with the selected set of control data and journal data; and when the selected journal data is performance data, retrieving performance data records from the selected journal data and store the performance data records in the second storage system.

In some embodiments, when the performance data control parameter associated with a particular secondary volume is ESTIMATE, the second controller is operable to perform a process of performance estimation which includes: based on the control data which is stored on the second memory during the process of restoring journal data, which is to be used to estimate performance of the particular primary volume corresponding to the particular secondary volume, and which is associated with the selected set of control data and journal data, estimating the performance of the particular primary volume; and creating and storing in the second memory a record of performance data for the particular secondary volume based on the estimated performance.

Another aspect of this invention is directed to a computer-readable storage medium storing a plurality of instructions for controlling a data processor to manage use of performance data in a system that comprises a first storage system including a first storage device and a first controller having a first processor and a first memory, and a second storage system including a second storage device and a second controller having a second processor and a second memory. The plurality of instructions comprise: instructions that cause the data processor to manage a primary volume in the first storage system of a remote copy pair with a secondary volume of the second storage system by using a storage area of the first storage device, and to send a first type copy data from the first storage system to the second storage system according to a remote copy procedure of the remote copy pair, so that the second storage system can update the secondary volume based on the first type copy data; and instructions that cause the data processor to create a second type copy data by using a performance data of the primary volume, and to send the second type copy data from the first storage system to the second storage system according to the remote copy procedure of the remote copy pair, so that the second storage system can use the performance data of the primary volume for a performance data of the secondary volume based on the second type copy data.

These and other features and advantages of the present invention will become apparent to those of ordinary skill in the art in view of the following detailed description of the specific embodiments.

BRIEF DESCRIPTION OF THE DRAWINGS

FIG. 1 illustrates an example of a configuration of a system in which the method and apparatus of the invention may be applied.

FIG. 2 illustrates an example of a configuration of a journal volume.

FIG. 3 shows an example of a software module configuration of the memory in the storage subsystem according to one embodiment.

FIG. 4 illustrates an example of the JNL Group mapping table.

FIG. 5 illustrates an example of the Volume Pair table.

FIG. 6 illustrates an example of the Journal Volume table.

FIG. 7 illustrates an example of the Performance Data table.

FIG. 8 shows an example of a flow diagram illustrating an initial copy process of the remote copy control on the primary storage system according to one embodiment of the present invention.

FIG. 9 shows an example of a flow diagram illustrating a process of the remote copy control for generating journal according to one embodiment of the present invention.

FIG. 10 shows an example of a flow diagram illustrating a process of generating performance data journal according to one embodiment of the present invention.

FIG. 11 shows an example of a flow diagram illustrating a process of restoring journal data to a SVOL in the secondary storage system using its corresponding control data according to one embodiment of the present invention.

FIG. 12 shows an example of a flow diagram illustrating a process of performance estimation according to one embodiment of the present invention.

DETAILED DESCRIPTION OF THE INVENTION

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transient medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for allowing the secondary storage system to use the performance data of the primary storage system in the secondary storage system in a remote copy situation between the two storage systems. One embodiment discloses how to back up the performance data of volumes between primary storage system and secondary storage system.

FIG. 1 illustrates an example of a configuration of a system in which the method and apparatus of the invention may be applied. Each site (Primary site 1*a* and Secondary site 1*b*) has Storage Subsystem 100 (100*a* and 100*b*), Host Computer 200 (200*a* and 200*b*), and Data Network 200 (200*a* and 200*b*). The two sites are connected via Remote Copy Network 400. Storage Subsystem 100 includes Storage Controller 110 and Disk Unit 120. Storage Controller 110 performs disk I/O functionality with Host Computer 200 via Data Network 200. Disk Unit 120 has plural storage devices such as Hard Disk Drive (HDD) and/or Solid State Drive (SSD). Storage Controller 110 has Processor 111, Memory 112, Management Interface (I/F) 113, Data Interface (I/F) 114, Disk Interface (I/F) 115, and Local Disk 116. Storage Controller 110 combines Disk Unit 120 and configures RAID (Redundant Arrays of Inexpensive Disks), and then provides Volume (VOL) to Host Computer 200. These functions are executed by application programs shown in FIG. 2. Data I/F 114 is an interface to Data Network 300 and Remote Copy Network 400. Management I/F 113 is an interface to management console via management network (not shown). Disk Interface 115 is an interface to Disk Unit 120. In one embodiment, the Data Network 300 is a Fibre Channel, and the Remote Copy Network 400 is a public communication network since the former is considerably shorter than the latter. The Host Computer 200 has Data I/F (not shown) connected to the Data Network 300.

The storage subsystem provides a plurality of logical volumes as storage areas for the host computers. The host computers use the identifiers of these logical volumes to read data from or write data to the storage subsystem. The identifiers of the logical volumes are referred to as Logical Unit Number (LUN). The logical volume may be included in a single physical storage device or a plurality of storage devices. Similarly, a plurality of logical volumes may be associated with a single physical storage device.

Referring back to FIG. 1, in the present embodiment, the write data is sent asynchronously between the primary storage system 100*a* and secondary storage system 100*b*. The primary host 200*a* includes an application program (APP) 210*a* to access (read and write) storage areas or volumes in the primary storage system 100*a*. In one embodiment, the APP 210*a* is operable to fail over to the secondary host 200*b* if the primary host 200*a* or/and primary storage system 100*a* become unavailable (i.e., experience failure) in order to provide uninterrupted access to data to users, particularly enterprise businesses.

The primary storage system 100*a* includes one or more primary data volumes (PVOL) 140*a*. PVOL 140*a* includes production data that APP on the Host 200*a* reads and writes. The secondary storage system includes one or more secondary volumes (SVOL) 140*b*. SVOL 140*b* includes copy data of PVOL 140*a*.

The primary storage subsystem 100 also includes journal group (JNLG) 130. The JNLG 130 is a set of volumes (one or more volumes) for which journal is to be generated. A volume can be a member of only one JNLG 130. JNLG 130 includes one or more data volumes 140 and/or one or more journal volumes (JVOL) 150. JNLG 130 has an attribute of either Master or Restore. A master JNLG 130*a* generates journal while a restore JNLG 130*b* restores journal to SVOLs 140*b*. The master JNLG 130*a* is associated with the primary storage system 100*a* and includes one or more PVOLs 140*a*, and includes one or more JVOL 150*a*. The restore JNLG 130*b* is associated with the secondary storage system 100*b* and includes one or more SVOLs 140*b*, and includes one or more JVOL 150*b*.

FIG. 2 illustrates an example of a configuration of JVOL 150. The JVOL 150 is configured to store a journal used in performing a remote copy of PVOL and its performance data. The journal includes a pair of data: control data 153 and journal data 154. The control data 153 is stored in a control data area 151 of the JVOL 150, and the journal data 154 is stored in a journal data area 152 of the JVOL 150.

In one implementation, the control data 153 includes a monitoring data flag 153-1 that indicates whether the journal data is PVOL data or PVOL performance data. An index (IDX) 153-2 is an identifier for PVOL 140*a* from which journal data is derived such as, e.g., the unique number assigned for PVOL in the primary storage system 100*a* or in a journal group 130*a*. A write destination address 153-3 provides an offset address in the PVOL, from which the write data is written such as, e.g., starting logical block address (LBA) of the write data. If the monitoring data flag 153-1 indicates the journal data is PVOL performance data, NULL value is stored in the write destination address 153-3 field. A data length 153-4 provides the length of the write data or performance data such as, e.g., the number of logical blocks or total bytes of the data. A creation time 153-5 indicates the time when a host writes data to PVOL 140*a* or when a performance data is created. A sequence number (SEQ#) 153-6 provides the sequence information of the write. The sequence number provides write ordering within the primary storage system 100*a*. When the monitoring data is stored in the journal data area, it also consumes the sequence number. A JVOL identification (JVOL_ID) 153-7 identifies the journal volume that contains corresponding journal data, e.g., a unique number assigned to the journal volume in primary storage system or in the journal group 130. A JVOL address 153-8 provides the offset address in the journal volume from which the journal data is stored or starting address of journal data. The control data 153 includes JVOL ID 153-7 and JVOL Address 153-8 since the control data 153 and the journal data are stored in separate areas in the present embodiment.

There are two types of journals: update journal and base journal. The update journal is a journal for data written from a host. The update journal is taken when a host writes data to PVOL 111*a*. The base journal is a journal for preexisting data that has been residing on PVOL 111*a* prior to pairing. The base journal is taken when a new copy of PVOL is created or resynchronization is necessary.

FIG. 3 shows an example of a software module configuration of the memory 112 in the storage subsystem 100 according to one embodiment. It includes I/O control 112-01, Remote Copy Control 112-02, Performance Monitoring 112-03, JNL Group mapping table 112-06, Volume Pair table 112-07, JNL Volume table 112-08, and Performance data table 112-09.

FIG. 4 illustrates an example of the JNL Group mapping table 112-06. The "JNL Group Mapping ID" field represents an identifier of JNL Group mapping between the primary storage system and secondary storage system. The "Primary Storage System" field represents an identifier of the primary storage system 100*a*. The "Primary JNL Group ID" field represents an identifier of primary JNL Group 130*a* which has primary data volumes 140*a* and journal volumes 150*a*. The "Secondary Storage System" field represents an identifier of the secondary storage system 100*b*. The "Secondary JNL Group ID" field represents an identifier of secondary JNL Group 130*b* which has secondary data volumes 140*b* and journal volumes 150*b*. The "Sequence Counter" field represents a sequence number of latest stored control data 153. The value of the sequence number (SEQ#) 153-6 of latest control data 153 is stored in this field.

The record of the JNL Group mapping table 112-06 without "Sequence Counter" field is specified and stored before starting remote copy by storage administrator.

FIG. 5 illustrates an example of the Volume Pair table 112-07. The "Pair ID" field represents an identifier of the pair of primary data volume 140*a* and secondary data volume 140*b*. The "JNL Group Mapping ID" field is reference to the record of JNL Group Mapping table 112-06. The "PVOL ID" field represents an identifier of PVOL 140*a* that is uniquely assigned to the volume in the primary storage system 100*a*. The "SVOL ID" field represents an identifier of SVOL 140*b* that is uniquely assigned to the volume in the secondary storage system 100*b*. The "Status" field represents the status of the volume pair. The volume pair may have the following status: COPY, PAIR, SUSP, and SMPL. The COPY status indicates that base journal is taken from the PVOL 140*a*. That is, the data stored in the PVOL prior to the pairing (i.e., preexisting data stored in the base journal) has been retrieved for copying to the SVOL 140*b*. The PAIR status indicates that all preexisting data have been copied to the SVOL and the journal group is or has retrieved updated data from the update journal for copying to the SVOL. The SUSP or suspend status indicates that the copy pair has suspended taking or retrieving updated data from the update journal. The SMPL status indicates that the volume pair has not started taking the preexisting data from the base journal, i.e., the remote copy is to begin. The "Size" field represents a size of PVOL and SVOL. The PVOL and SVOL must have the same capacity to store data. The "BJPtr" field represents a base journal pointer (BJPtr) which shows the pointer to the next target block which should be copied during initial copy. The "Perf. Data Ctrl" field represents a method of performance data control which has one of the following values: COPY, NONE, and ESTIMATE. The COPY value indicates the performance data of the PVOL should be copied from primary storage system 100*a* to the secondary storage system 100*b*. The NONE value indicates the performance data of the PVOL should not be copied from primary storage system 100*a* to the secondary storage system 100*b*. The ESTIMATE value indicates the secondary storage system 100*b* estimates performance data of the PVOL from the control data 153 which is received from primary storage system 100*a* instead of copying the performance data. The record of the Volume pair table 112-07 is specified and stored before starting remote copy of the PVOL by storage administrator.

FIG. 6 illustrates an example of the Journal Volume table 112-08. The "JNL Group ID" field represents the JNL Group 130. The "JNL Volume ID" field represents an identifier of JNL Volume 150 which is assigned to the JNL Group 130. The "Size" field represents a size of JNL Volume 150. The record of the Volume pair table 112-08 is specified and stored before starting remote copy of the PVOL and modified when JNL Volume 150 is added to the JNL Group 130 by storage administrator.

FIG. 7 illustrates an example of the Performance Data table 112-09. The "Volume ID" field represents the volume identifier that is uniquely assigned to the volume in the storage system 100. The "Timestamp" field represents the time which the record stored. The "Read I/O" field represents the read I/O rate which is calculated from read I/O count of the volume in the period of the calculation. The "Read Xfer" field represents the total transfer rate which is calculated from read bytes of the volume in the period of the calculation. The "Write I/O" field represents the write I/O rate which is calculated from write I/O count of the volume in the period of the calculation. The "Write Xfer" field represents the total transfer rate which is calculated from write bytes of the volume in the period of the calculation. The "Read Hit" field represents the read cache hit rate of the volume.

The "Write Hit" field represents the write cache hit rate of the volume.

FIG. 8 shows an example of a flow diagram illustrating an initial copy process of the remote copy control 112-02 on the primary storage system 100*a* according to one embodiment of the present invention. In the present embodiment, as a pre-condition of the process, JNL Group Mapping table 112-06, Volume Pair table 112-07, and Journal Volume table 112-08 are configured by the storage administrator. Also, performance data of the target PVOL is stored in the Performance Data table 112-09. The initial copy process is started when the remote copy control 112-02 of the primary storage system 100a receives a Read JNL request from the secondary storage system 100b.

At step 01-01, a base journal pointer (BJPtr) which is stored inside a memory during initial copy is initialized to start taking base journal from the first data (e.g., first block, track, chunk of blocks, or any addressable data on the data volume) in the target PVOL 140a.

At step 01-02, a next target is retrieved. The next target is obtained from the value of BJPtr. For example, the next target is j-th block if BJPtr has j. In one embodiment, a journal is taken for several blocks of data at a time for more efficient processing. Accordingly, the next target after the j-th block is n blocks from the j-th block in the present example.

At step 01-03, the process determines whether there is additional target. If more targets exist, the process goes to step 01-04. If no more targets exist, the process goes to step 01-08 (i.e., all base journals have been taken).

At step 01-04, if an additional target exists, a control data for the target blocks is created. The created control data is stored in a memory 112a in the primary storage system 100a. The target data is read from PVOL 140a to the memory. After reading the target data, the control data is validated. The control data includes the following information: zero in the Performance Data Flag 153-1, PVOL ID in the Index 153-2, address of target data in the Write Destination Address 153-3, length of target data in the Length 153-4, current time in the creation time 153-5, and incremented sequence number in the Sequence Number 153-6. NULL is stored in the JVOL ID 153-7 and JVOL Address 153-8, because the journal data is not stored in JVOL during this process in the present embodiment.

At step 01-06, the journal data and control data are sent to the secondary storage system 100b.

At step 01-07, the BJPtr is incremented to the next target after successfully transmitting the journals. That is, BJPtr is incremented to be j+n. Steps from step 01-02 to step 01-07 are repeated until no more target exists.

At step 01-08, the process determines whether the "Pert. Data Ctrl" field related to the PVOL is COPY or not. If the value of the field is COPY, the process goes to step 01-09. Otherwise, the process ends.

At step 01-09, the process sets zero to "Last Timestamp" field of the Volume Pair Table 112-07.

At step 01-10, the remote copy control 112-02 sorts the records of the performance data table 112-09 in ascending order by the "Timestamp" field, and then selects one or plural records which have PVOL ID in the "Volume ID" field and which has a later timestamp than the "Last Timestamp" of the Volume Pair Table 112-07.

At step 01-11, the process determines whether there is additional performance data. If more performance data exists, the process goes to step 01-12. If no more performance data exists, the process ends.

At step 01-12, if an additional performance data exists, a journal data and a control data for the performance data are created. The created journal data and control data are stored in a memory 112a in the primary storage system 100a. The control data includes the following information: 1 (TRUE) in the Performance Data Flag 153-1, PVOL ID in the Index 153-2, NULL in the Write Destination Address 153-3, length of target performance data in the Length 153-4, current time in the creation time 153-5, and incremented sequence number in the Sequence Number 153-6. NULL is stored in the JVOL ID 153-7 and JVOL Address 153-8, because the journal data is not stored in JVOL during this process in the present embodiment.

At step 01-13, the journal data and control data are sent to the secondary storage system 100b.

At step 01-14, the "Last Timestamp" of Volume Pair Table 112-07 is updated to the latest timestamp value in the selected records of performance data table.

Steps from step 01-08 to step 01-13 are repeated until no more target performance data exists.

FIG. 9 shows an example of a flow diagram illustrating a process of the remote copy control 112-02a for generating journal according to one embodiment of the present invention. This flow is performed after the I/O control 112-01a receives the write command from the host 200a.

At step 02-01, the remote copy control 112-02a determines whether a write command has been received. All read commands are ignored at this time. The remote copy control 112-02a also determines if the pair status of PVOL is COPY or PAIR. If these conditions are not satisfied, then the process ends. If these conditions are satisfied, the remote copy control 112-02a proceeds to step 02-02.

At step 02-02, the remote copy control 112-02a checks if the pair status is COPY. If the pair status is not COPY, the process proceeds to step 02-04. Otherwise, the process proceeds to step 02-03.

At step 02-03, the remote copy control 112-02a checks if base journal has already been taken for the write target address. This is done by examining the BJPtr. That is, if (Write Target Address)≤BJPtr, then the process proceeds to step 02-04. Otherwise (i.e., if taken), the process ends.

At step 02-04, control data and journal data for the write command are created. The created control data and journal data are stored in a JNL Volume 150a in the primary storage system 100a. The control data includes the following information: zero in the Performance Data Flag 153-1, PVOL ID in the Index 153-2, address of target data in the Write Destination Address 153-3, length of target data in the Length 153-4, current time in the creation time 153-5, and incremented sequence number in the Sequence Number 153-6. The journal volume ID and stored address of Journal Data Area 152 are stored in the JVOL ID 153-7 and JVOL Address 153-8, respectively.

FIG. 10 shows an example of a flow diagram illustrating a process of generating performance data journal according to one embodiment of the present invention. The remote copy control 112-02a on the primary storage system 100a periodically invokes the flow for each PVOL 140a. This is done after the initial copy process of FIG. 8.

At step 03-01, the remote copy control 112-02a selects a record related to the PVOL 140a from the Volume Pair Table 112-07, and checks if a value of the "Pert. Data Ctrl" field is COPY. If no, the process ends. If yes, the process proceeds to step 03-02.

At step 03-02, the remote copy control 112-02 sorts the records of the performance data table 112-09 in ascending order by the "Timestamp" field, and then selects one or plural records which has PVOL ID in the "Volume ID" field and which has a later timestamp than the "Last Timestamp" of the Volume Pair Table 112-07.

At step 03-03, the process determines whether there is additional performance data. If more performance data exists, the process goes to step 03-04. If no more performance data exists, the process ends.

At step 03-04, if an additional performance data exists, a journal data and a control data for the performance data are created. The created journal data and control data are stored in a JNL Volume 150*a* in the primary storage system 100*a*. The control data includes the following information: 1 (TRUE) in the Performance Data Flag 153-1, PVOL ID in the Index 153-2, NULL in the Write Destination Address 153-3, length of target performance data in the Length 153-4, current time in the creation time 153-5, and incremented sequence number in the Sequence Number 153-6. The journal volume ID and stored address of Journal Data Area 152 are stored in the JVOL ID 153-7 and JVOL Address 153-8, respectively.

At step 03-05, the "Last Timestamp" of Volume Pair Table 112-07 is updated to the latest timestamp value in the selected records of performance data table.

FIG. 11 shows an example of a flow diagram illustrating a process of restoring journal data to a SVOL 140*b* in the secondary storage system 100*b* using its corresponding control data according to one embodiment of the present invention. The remote copy control 112-02*b* on the secondary storage system 100*b* periodically invokes the flow (e.g., every 10 seconds).

At step 04-01, a next journal including control data and journal data to be stored to the SVOL 140*b* is selected using the sequence number. For this purpose, the secondary storage system 100*b* keeps track of the sequence number of the journal that has been restored. The remote copy control 112-02*b* on the secondary storage system 100*b* determines the next journal to be restored by comparing the sequence number of the most recently restored journal with sequence numbers associated with the journals temporarily stored in the memory.

At step 04-02, the remote copy control 112-02*b* finds a SVOL to store journal data by referring to the Index 153-2 and Volume Pair table 112-07.

At step 04-03, the remote copy control 112-02*b* checks if the journal data is performance data by checking the Performance Data Flag 153-1 of the control data. If no (i.e., the journal data is not performance data), then the process proceeds to step 04-04. If the journal data is performance data, the process proceeds to step 04-07.

At step 04-04, the journal data is stored in the SVOL 140*b* at the address indicated by the Write Destination Address 153-3 for the length corresponding to the Data Length 153-4.

At step 04-05, the remote copy control 112-02*b* determines whether the "Perf. Data Ctrl" field related to the SVOL is ESTIMATE or not. If the value of the field is ESTIMATE, the process goes to step 04-06. Otherwise, the process ends.

At step 04-06, the remote copy control 112-02*b* stores the control data on the memory to estimate the performance of PVOL 140*a*.

At step 04-07, the remote copy control 112-02*b* retrieves the performance data records from the journal data and updates the "Volume ID" of the performance data records to SVOL ID. Then, the remote copy control 112-02*b* store them into the performance data table 112-09 of the secondary storage system 100*b*.

FIG. 12 shows an example of a flow diagram illustrating a process of performance estimation according to one embodiment of the present invention. The remote copy control 112-02*b* on the secondary storage system 100*b* periodically invokes the flow (e.g., every 1 minute) for each SVOL 140*b*.

At step 05-01, the remote copy control 112-02*b* gets the control data on the memory which is stored at previous step 04-06 and related to the SVOL 140*b*.

At step 05-02, the process determines whether there is the control data on the memory. If the control data exists, the process goes to step 05-03. If no control data exists, the process ends.

At step 05-03, the remote copy control 112-02*b* estimates the performance of PVOL using the control data. In a specific example, the Write I/O is estimated from the count of control data, and Write Xfer is estimated from the sum of Data Length of the control data.

At step 05-04, the remote copy control 112-02*b* creates a record of the performance data table 112-09*b* from the calculated data at previous step 05-03 and stores it.

Of course, the system configuration illustrated in FIG. 1 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for allowing the secondary storage system to use the performance data of the primary storage system in the secondary storage system in a remote copy situation between the two storage systems. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage system comprising:
   a storage device; and
   a controller including a processor and a memory, and being operable to manage a primary volume in the storage system of a remote copy pair with a secondary volume of another storage system by using a storage area of the storage device, and to send a first type copy data from the storage system to said another storage system according to a remote copy procedure of the remote copy pair, so that said another storage system can update the secondary volume based on the first type copy data;
   wherein the controller is operable to create a second type copy data by using a performance data of the primary volume, and to send the second type copy data from the storage system to said another storage system according to the remote copy procedure of the remote copy pair, so that said another storage system can use the performance data of the primary volume for a performance data of the secondary volume based on the second type copy data;
   wherein the storage system includes a plurality of primary volumes and the controller is operable to manage the primary volumes of remote copy pairs with secondary volumes of said another storage system by using storage areas of the storage device;
   wherein the performance data of the primary volumes are stored in the memory with timestamps corresponding to the primary volumes;
   wherein each primary volume has a performance data control parameter which is associated with a corresponding secondary volume of a remote copy pair and indicates whether the performance data of said each primary volume is to be copied from the storage system to said another storage system; and
   wherein upon receiving a request from said another storage system to read the second type copy data, the controller is operable to identify one or more primary volumes for which the performance data control parameter indicates the performance data of the one or more primary volumes are to be copied from the storage system to said another storage system, to set zero to a "Last Timestamp" of each remote copy pair associated with the one or more primary volumes, and for each particular primary volume of the one or more primary volumes, to perform an initial copy process which includes:
   sorting records of the performance data of the one or more primary volumes in ascending order by the corresponding timestamps, and selecting one or more records of the sorted records of the performance data of the particular primary volume that have a later timestamp than the "Last Timestamp" of the remote copy pair associated with the particular primary volume;
   creating and storing in the storage system a journal data and a control data for the selected one or more records of the performance data, the control data including a performance data flag that is set to indicate that the journal data is the performance data, and a sequence number that is incremented;
   sending the created journal data and control data as the second type copy data to said another storage system;
   updating the "Last Timestamp" of the remote copy pair associated with the particular primary volume to a latest timestamp value of the selected one or more records of performance data of the particular primary volume; and
   repeating the sorting and selecting, the creating and storing, the sending, and the updating until the one or more primary volumes are all processed.

2. The storage system according to claim 1, wherein after the initial copy process, the controller is operable to periodically perform a process of generating the second type copy data for each particular primary volume of the one or more primary volumes for which the performance data control parameter indicates the performance data of the one or more primary volumes are to be copied from the storage system to said another storage system, the process of generating the second type copy data including:
   sorting records of the performance data of the one or more primary volumes in ascending order by the corresponding timestamps, and selecting one or more records of the sorted records of the performance data of the particular primary volume that have a later timestamp than the "Last Timestamp" of the remote copy pair associated with the particular primary volume;
   creating and storing in the storage system a journal data and a control data for the selected one or more records of the performance data, the control data including a performance data flag that is set to indicate that the journal data is the performance data, and a sequence number that is incremented; and
   updating the "Last Timestamp" of the remote copy pair associated with the particular primary volume to a latest timestamp value of the selected one or more records of performance data of the particular primary volume.

3. The storage system according to claim 1, wherein upon receiving a write command from a host computer to write data to a write target region of the primary volume, the controller is operable to:
   determine whether a pair status of a remote copy pair associated with the primary volume is COPY or PAIR;
   when the pair status is COPY, determine whether a base journal for preexisting data that has been residing on the primary volume prior to pairing with the secondary volume has already been taken; and
   when (i) the pair status is PAIR or (ii) the pair status is COPY and the base journal has not been taken, create and store in the storage system a journal data and a control data for the write command, the control data including a performance data flag that is set to indicate that the journal data is primary volume data of the primary volume, and a sequence number that is incremented, and send the created journal data and control data as the first type copy data to said another storage system.

4. The storage system according to claim 1,
   wherein the first type copy data comprises a first type journal data; and
   wherein the second type copy data comprises a second type journal data.

5. The storage system according to claim 4,
   wherein the first type copy data comprises a first type control data having a performance data flag that is set to indicate that the first type journal data is primary volume data of the primary volume; and wherein the second type copy data comprises a second type control data having a performance data flag that is set to indicate that the second type journal data is the performance data of the primary volume.

6. A system comprising:

a first storage system including a first storage device and a first controller having a first processor and a first memory; and a second storage system including a second storage device and a second controller having a second processor and a second memory;

wherein the first controller is operable to manage a primary volume in the first storage system of a remote copy pair with a secondary volume of the second storage system by using a storage area of the first storage device, and to send a first type copy data from the first storage system to the second storage system according to a remote copy procedure of the remote copy pair, so that the second storage system can update the secondary volume based on the first type copy data;

wherein the first controller is operable to create a second type copy data by using a performance data of the primary volume, and to send the second type copy data from the first storage system to the second storage system according to the remote copy procedure of the remote copy pair, so that the second storage system can use the performance data of the primary volume for a performance data of the secondary volume based on the second type copy data;

wherein the first storage system includes a plurality of primary volumes and the first controller is operable to manage the primary volumes of remote copy pairs with secondary volumes of the second storage system by using storage areas of the first storage device;

wherein the performance data of the primary volumes are stored in the first memory with timestamps corresponding to the primary volumes;

wherein each primary volume has a performance data control parameter which is associated with a corresponding secondary volume of a remote copy pair and indicates whether the performance data of said each primary volume is to be copied from the first storage system to the second storage system; and wherein upon receiving a request from the second storage system to read the second type copy data, the first controller is operable to identify one or more primary volumes for which the performance data control parameter indicates the performance data of the one or more primary volumes are to be copied from the first storage system to the second storage system, to set zero to a "Last Timestamp" of each remote copy pair associated with the one or more primary volumes, and for each particular primary volume of the one or more primary volumes, to perform an initial copy process which includes:

sorting records of the performance data of the one or more primary volumes in ascending order by the corresponding timestamps, and selecting one or more records of the sorted records of the performance data of the particular primary volume that have a later timestamp than the "Last Timestamp" of the remote copy pair associated with the particular primary volume;

creating and storing in the first storage system a journal data and a control data for the selected one or more records of the performance data, the control data including a performance data flag that is set to indicate that the journal data is the performance data, and a sequence number that is incremented;

sending the created journal data and control data as the second type copy data to the second storage system;

updating the "Last Timestamp" of the remote copy pair associated with the particular primary volume to a latest timestamp value of the selected one or more records of performance data of the particular primary volume; and repeating the sorting and selecting, the creating and storing, the sending, and the updating until the one or more primary volumes are all processed.

7. The system according to claim 6, wherein after the initial copy process, the first controller is operable to periodically perform a process of generating the second type copy data for each particular primary volume of the one or more primary volumes for which the performance data control parameter indicates the performance data of the one or more primary volumes are to be copied from the first storage system to the second storage system, the process of generating the second type copy data including:

sorting records of the performance data of the one or more primary volumes in ascending order by the corresponding timestamps, and selecting one or more records of the sorted records of the performance data of the particular primary volume that have a later timestamp than the "Last Timestamp" of the remote copy pair associated with the particular primary volume;

creating and storing in the first storage system a journal data and a control data for the selected one or more records of the performance data, the control data including a performance data flag that is set to indicate that the journal data is the performance data, and a sequence number that is incremented; and updating the "Last Timestamp" of the remote copy pair associated with the particular primary volume to a latest timestamp value of the selected one or more records of performance data of the particular primary volume.

8. The system according to claim 6, wherein the second controller of the second storage system is operable to store received sets of control data and journal data in the second memory, and wherein the second controller of the second storage system is operable to periodically perform a process of restoring journal data to the secondary volume, the process of restoring journal data including:

selecting a next set of control data and journal data to restore using the sequence number by keeping track of the sequence number of each set of control data and journal data which has been restored and comparing the sequence number of a most recently restored journal data with the sequence numbers of the sets of control data and journal data stored in the second memory;

finding a secondary volume in the second storage system which corresponds to the primary volume associated with the selected set of control data and journal data;

determining whether the selected journal data is performance data by checking the performance data flag of the selected control data;

when the selected journal data is not performance data, storing the selected journal data in the corresponding secondary volume based on the selected control data, determining whether the performance data control parameter associated with the secondary volume is ESTIMATE or not and, if ESTIMATE, storing the selected control data on the second memory to be used to estimate performance of the primary volume associated with the selected set of control data and journal data; and when the selected journal data is performance data, retrieving performance data records from the selected journal data and store the performance data records in the second storage system.

9. The system according to claim 8, wherein when the performance data control parameter associated with a particular secondary volume is ESTIMATE, the second controller is operable to perform a process of performance estimation which includes:
based on the control data which is stored on the second memory during the process of restoring journal data, which is to be used to estimate performance of the particular primary volume corresponding to the particular secondary volume, and which is associated with the selected set of control data and journal data, estimating the performance of the particular primary volume; and
creating and storing in the second memory a record of performance data for the particular secondary volume based on the estimated performance.

10. The system according to claim 6, wherein upon receiving a write command from a host computer by the first storage system to write data to a write target region of the primary volume, the first controller is operable to:
determine whether a pair status of a remote copy pair associated with the primary volume is COPY or PAIR;
when the pair status is COPY, determine whether a base journal for preexisting data that has been residing on the primary volume prior to pairing with the secondary volume has already been taken; and
when (i) the pair status is PAIR or (ii) the pair status is COPY and the base journal has not been taken, create and store in the first storage system a journal data and a control data for the write command, the control data including a performance data flag that is set to indicate that the journal data is primary volume data of the primary volume, and a sequence number that is incremented, and send the created journal data and control data as the first type copy data to the second storage system.

11. The system according to claim 6,
wherein the first type copy data comprises a first type journal data; and
wherein the second type copy data comprises a second type journal data.

12. The system according to claim 11,
wherein the first type copy data comprises a first type control data having a performance data flag that is set to indicate that the first type journal data is primary volume data of the primary volume; and
wherein the second type copy data comprises a second type control data having a performance data flag that is set to indicate that the second type journal data is the performance data of the primary volume.

13. A non-transitory computer-readable storage medium storing a plurality of instructions for controlling a data processor to manage use of performance data in a system that comprises a first storage system including a first storage device and a first controller having a first processor and a first memory, and a second storage system including a second storage device and a second controller having a second processor and a second memory; the plurality of instructions comprising:
instructions that cause the data processor to manage a primary volume in the first storage system of a remote copy pair with a secondary volume of the second storage system by using a storage area of the first storage device, and to send a first type copy data from the first storage system to the second storage system according to a remote copy procedure of the remote copy pair, so that the second storage system can update the secondary volume based on the first type copy data; and
instructions that cause the data processor to create a second type copy data by using a performance data of the primary volume, and to send the second type copy data from the first storage system to the second storage system according to the remote copy procedure of the remote copy pair, so that the second storage system can use the performance data of the primary volume for a performance data of the secondary volume based on the second type copy data;
wherein the first storage system includes a plurality of primary volumes and the first controller is operable to manage the primary volumes of remote copy pairs with secondary volumes of the second storage system by using storage areas of the first storage device;
wherein the performance data of the primary volumes are stored in the first memory with timestamps corresponding to the primary volumes;
wherein each primary volume has a performance data control parameter which is associated with a corresponding secondary volume of a remote copy pair and indicates whether the performance data of said each primary volume is to be copied from the first storage system to the second storage system; and
wherein the plurality of instructions further comprise:
instructions that cause the data processor, upon receiving a request from the second storage system to read the second type copy data, to identify one or more primary volumes for which the performance data control parameter indicates the performance data of the one or more primary volumes are to be copied from the first storage system to the second storage system, to set zero to a "Last Timestamp" of each remote copy pair associated with the one or more primary volumes, and for each particular primary volume of the one or more primary volumes, to perform an initial copy process which includes:
sorting records of the performance data of the one or more primary volumes in ascending order by the corresponding timestamps, and selecting one or more records of the sorted records of the performance data of the particular primary volume that have a later timestamp than the "Last Timestamp" of the remote copy pair associated with the particular primary volume;
creating and storing in the first storage system a journal data and a control data for the selected one or more records of the performance data, the control data including a performance data flag that is set to indicate that the journal data is the performance data, and a sequence number that is incremented;
sending the created journal data and control data as the second type copy data to the second storage system;
updating the "Last Timestamp" of the remote copy pair associated with the particular primary volume to a latest timestamp value of the selected one or more records of performance data of the particular primary volume; and
repeating the sorting and selecting, the creating and storing, the sending, and the updating until the one or more primary volumes are all processed.

14. The non-transitory computer-readable storage medium according to claim 13, wherein after the initial copy process, the plurality of instructions further comprise instructions that cause the data processor to periodically perform a process of generating the second type copy data for each particular primary volume of the one or more primary volumes for which the performance data control parameter indicates the performance data of the one or more primary volumes are to be copied from the first storage system to the second storage system, the process of generating the second type copy data including:

sorting records of the performance data of the one or more primary volumes in ascending order by the corresponding timestamps, and selecting one or more records of the sorted records of the performance data of the particular primary volume that have a later timestamp than the "Last Timestamp" of the remote copy pair associated with the particular primary volume;

creating and storing in the first storage system a journal data and a control data for the selected one or more records of the performance data, the control data including a performance data flag that is set to indicate that the journal data is the performance data, and a sequence number that is incremented; and updating the "Last Timestamp" of the remote copy pair associated with the particular primary volume to a latest timestamp value of the selected one or more records of performance data of the particular primary volume.

15. The non-transitory computer-readable storage medium according to claim 13, wherein the plurality of instructions further comprise instructions that cause the data processor to store received sets of control data and journal data in the second memory, and instructions that cause the data processor to periodically perform a process of restoring journal data to the secondary volume, the process of restoring journal data including:

selecting a next set of control data and journal data to restore using the sequence number by keeping track of the sequence number of each set of control data and journal data which has been restored and comparing the sequence number of a most recently restored journal data with the sequence numbers of the sets of control data and journal data stored in the second memory;

finding a secondary volume in the second storage system which corresponds to the primary volume associated with the selected set of control data and journal data;

determining whether the selected journal data is performance data by checking the performance data flag of the selected control data;

when the selected journal data is not performance data, storing the selected journal data in the corresponding secondary volume based on the selected control data, determining whether the performance data control parameter associated with the secondary volume is ESTIMATE or not and, if ESTIMATE, storing the selected control data on the second memory to be used to estimate performance of the primary volume associated with the selected set of control data and journal data; and when the selected journal data is performance data, retrieving performance data records from the selected journal data and store the performance data records in the second storage system.

16. The non-transitory computer-readable storage medium according to claim 15, wherein when the performance data control parameter associated with a particular secondary volume is ESTIMATE, the plurality of instructions further comprise instructions that cause the data processor to perform a process of performance estimation which includes:

based on the control data which is stored on the second memory during the process of restoring journal data, which is to be used to estimate performance of the particular primary volume corresponding to the particular secondary volume, and which is associated with the selected set of control data and journal data, estimating the performance of the particular primary volume; and creating and storing in the second memory a record of performance data for the particular secondary volume based on the estimated performance.

17. The non-transitory computer-readable storage medium according to claim 13, wherein the plurality of instructions further comprise, upon receiving a write command from a host computer by the first storage system to write data to a write target region of the primary volume, instructions that cause the data processor to:

determine whether a pair status of a remote copy pair associated with the primary volume is COPY or PAIR;

when the pair status is COPY, determine whether a base journal for preexisting data that has been residing on the primary volume prior to pairing with the secondary volume has already been taken; and when (i) the pair status is PAIR or (ii) the pair status is COPY and the base journal has not been taken, create and store in the first storage system a journal data and a control data for the write command, the control data including a performance data flag that is set to indicate that the journal data is primary volume data of the primary volume, and a sequence number that is incremented, and send the created journal data and control data as the first type copy data to the second storage system.

18. The non-transitory computer-readable storage medium according to claim 13, wherein the plurality of instructions further comprise instructions that cause the data processor, upon receiving a write command from a host computer by the first storage system to write data to a write target region of the primary volume, to:

determine whether a pair status of a remote copy pair associated with the primary volume is COPY or PAIR;

when the pair status is COPY, determine whether a base journal for preexisting data that has been residing on the primary volume prior to pairing with the secondary volume has already been taken; and when (i) the pair status is PAIR or (ii) the pair status is COPY and the base journal has not been taken, create and store in the first storage system a journal data and a control data for the write command, the control data including a performance data flag that is set to indicate that the journal data is primary volume data of the primary volume, and a sequence number that is incremented, and send the created journal data and control data as the first type copy data to the second storage system.

19. The non-transitory computer-readable storage medium according to claim 13, wherein the first type copy data comprises a first type journal data; and wherein the second type copy data comprises a second type journal data.

20. The non-transitory computer-readable storage medium according to claim 19, wherein the first type copy data comprises a first type control data having a performance data flag that is set to indicate that the first type journal data is primary volume data of the primary volume; and wherein the second type copy data comprises a second type control data having a performance data flag that is set to indicate that the second type journal data is the performance data of the primary volume.

\* \* \* \* \*